United States Patent
Shattil et al.

(10) Patent No.: US 12,034,528 B2
(45) Date of Patent: *Jul. 9, 2024

(54) DETECTION, ANALYSIS, AND COUNTERMEASURES FOR RADIO TRANSCEIVERS

(71) Applicant: Tybalt, LLC, Boulder, CO (US)

(72) Inventors: Steve Shattil, Cheyenne, WY (US); Robi Sen, Richland, WA (US); Thomas J Hoeft, Pasco, WA (US)

(73) Assignee: Tybalt, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,733

(22) Filed: Feb. 28, 2023

(65) Prior Publication Data

US 2023/0208549 A1 Jun. 29, 2023

Related U.S. Application Data

(63) Continuation of application No. 17/340,712, filed on Jun. 7, 2021, now Pat. No. 11,595,149, which is a
(Continued)

(51) Int. Cl.
*H04K 3/00* (2006.01)
*G06N 5/04* (2023.01)
(Continued)

(52) U.S. Cl.
CPC ............... *H04K 3/92* (2013.01); *G06N 5/04* (2013.01); *G06N 20/00* (2019.01); *H04W 4/40* (2018.02);
(Continued)

(58) Field of Classification Search
CPC .......... H04K 3/92; H04W 4/40; H04W 12/79; H04W 12/122; G06N 20/00; G06N 5/04
See application file for complete search history.

(56) References Cited

U.S. PATENT DOCUMENTS

| 7,430,257 B1 | 9/2008 | Shattil |
| 8,254,847 B2 | 8/2012 | Sen |

(Continued)

FOREIGN PATENT DOCUMENTS

| KR | 10-2013-0009895 | 1/2013 |
| WO | 2014-116314 | 7/2014 |
| WO | 2017-058966 | 4/2017 |

OTHER PUBLICATIONS

Amirhossein Fereidountabar, Gian Carlo Cardarilli, Luca Di Nunzio, Rocco Fazzolari; "UAV Channel Estimation with STBC in MIMO Systems"; The International Conference on Advanced Wireless, Information, and Communication Technologies (AWICT 2015).

(Continued)

*Primary Examiner* — David Bilodeau
(74) *Attorney, Agent, or Firm* — Steven J Shattil

(57) ABSTRACT

A computer-implementable method employs network signal metadata to train a cognitive learning and inference system to produce an inferred function, wherein the metadata comprises a syntactic structure of at least one network communication protocol. The inferred function is used to map metadata of a detected network signal to a cognitive profile of a transmitter of the detected network signal. The mapping effects intelligent discrimination of the transmitter from at least one other transmitter through corroborative or negating evidentiary observation of properties associated with the metadata of the detected network signal. Information content in the network signal can be determined from the inferred function or the cognitive profile without demodulating the network signal.

20 Claims, 5 Drawing Sheets

Related U.S. Application Data continuation of application No. 16/157,615, filed on Oct. 11, 2018, now Pat. No. 11,032,022.

(60) Provisional application No. 62/570,768, filed on Oct. 11, 2017.

(51) Int. Cl.

| | | |
|---|---|---|
| *G06N 20/00* | (2019.01) | |
| *H04W 4/40* | (2018.01) | |
| *H04W 12/122* | (2021.01) | |
| *H04W 12/79* | (2021.01) | |

(52) U.S. Cl.
CPC ......... *H04W 12/122* (2021.01); *H04W 12/79* (2021.01); *H04K 2203/22* (2013.01)

(56) References Cited

U.S. PATENT DOCUMENTS

| | | | |
|---|---|---|---|
| 8,670,390 | B2 | 3/2014 | Shattil |
| 8,750,934 | B2 | 6/2014 | Lucidarme |
| 8,918,540 | B2 | 12/2014 | Corman et al. |
| 8,942,082 | B2 | 1/2015 | Shattil |
| 8,942,197 | B2 | 1/2015 | Rudnick et al. |
| 8,955,110 | B1 | 2/2015 | Twitchell, Jr. |
| 8,983,455 | B1 | 3/2015 | Frolov et al. |
| 9,042,333 | B2 | 5/2015 | Shattil |
| 9,083,425 | B1 | 7/2015 | Frolov et al. |
| 9,108,729 | B2 | 8/2015 | Duggan et al. |
| 9,170,117 | B1 | 10/2015 | Abuelsaad et al. |
| 9,275,645 | B2 | 3/2016 | Hearing et al. |
| 9,302,782 | B2 | 4/2016 | Frolov et al. |
| 9,337,889 | B1 | 5/2016 | Stapleford |
| 9,356,727 | B2 | 5/2016 | Immendorf et al. |
| 9,363,690 | B1 | 6/2016 | Singh et al. |
| 9,406,237 | B2 | 8/2016 | Downey et al. |
| 9,412,278 | B1 | 8/2016 | Gong et al. |
| 9,432,095 | B2 | 8/2016 | Berlin et al. |
| 9,479,392 | B2 | 10/2016 | Anderson et al. |
| 9,479,964 | B2 | 10/2016 | Jalali |
| 9,483,950 | B1 | 11/2016 | Wang et al. |
| 9,529,360 | B1 | 12/2016 | Melamed et al. |
| 9,537,561 | B1 | 1/2017 | Kotecha et al. |
| 2006/0235584 | A1 | 10/2006 | Fregene et al. |
| 2008/0095121 | A1 | 4/2008 | Shattil |
| 2009/0118875 | A1 | 5/2009 | Stroud |
| 2009/0216757 | A1 | 8/2009 | Sen et al. |
| 2009/0326735 | A1 | 12/2009 | Wood et al. |
| 2010/0170383 | A1 | 7/2010 | Willner |
| 2011/0009053 | A1 | 1/2011 | Anglin, Jr. et al. |
| 2011/0292976 | A1 | 12/2011 | Sen et al. |
| 2012/0309288 | A1 | 12/2012 | Lu |
| 2012/0322360 | A1 | 12/2012 | Sen et al. |
| 2014/0180738 | A1 | 6/2014 | Phillipps et al. |
| 2014/0219124 | A1 | 8/2014 | Chang et al. |
| 2014/0219449 | A1 | 8/2014 | Shattil |
| 2014/0249693 | A1 | 9/2014 | Stark et al. |
| 2015/0009945 | A1 | 1/2015 | Shattil |
| 2015/0229434 | A1 | 8/2015 | Shawn |
| 2015/0236778 | A1 | 8/2015 | Jalali |
| 2015/0249498 | A1 | 9/2015 | Minguez Rascon et al. |
| 2015/0301529 | A1 | 10/2015 | Pillai et al. |
| 2015/0302858 | A1 | 10/2015 | Hearing et al. |
| 2016/0086621 | A1 | 3/2016 | Hearing et al. |
| 2016/0095001 | A1 | 3/2016 | Uelk et al. |
| 2016/0100415 | A1 | 4/2016 | Mishra et al. |
| 2016/0116915 | A1 | 4/2016 | Pulleti et al. |
| 2016/0118059 | A1 | 4/2016 | Hearing et al. |
| 2016/0119052 | A1 | 4/2016 | Frerking et al. |
| 2016/0119938 | A1 | 4/2016 | Frerking et al. |
| 2016/0134358 | A1 | 5/2016 | Jalali |
| 2016/0135204 | A1 | 5/2016 | Mishra et al. |
| 2016/0142880 | A1 | 5/2016 | Talluri et al. |
| 2016/0189732 | A1 | 6/2016 | Hearing et al. |
| 2016/0219506 | A1 | 7/2016 | Pratt et al. |
| 2016/0245907 | A1 | 8/2016 | Parker et al. |
| 2016/0246297 | A1 | 8/2016 | Song |
| 2016/0300493 | A1 | 10/2016 | Ubhi et al. |
| 2016/0300495 | A1 | 10/2016 | Kantor et al. |
| 2016/0309337 | A1 | 10/2016 | Priest et al. |
| 2016/0330771 | A1 | 11/2016 | Tan |
| 2016/0335476 | A1 | 11/2016 | Renkis |
| 2016/0337871 | A1 | 11/2016 | Wieneke et al. |
| 2016/0357192 | A1 | 12/2016 | McGrew et al. |
| 2016/0358432 | A1 | 12/2016 | Branscomb et al. |
| 2016/0364989 | A1 | 12/2016 | Speasl et al. |
| 2017/0192089 | A1 | 7/2017 | Parker et al. |
| 2017/0313439 | A1 | 11/2017 | Holt et al. |
| 2018/0190130 | A1 | 7/2018 | Kube et al. |
| 2019/0363821 | A1 | 11/2019 | Whittaker |

OTHER PUBLICATIONS

Liu Tao, Hu Yonghui, Hua Yu, Wu Meifang; "Study on Autonomous and Distributed Time Synchronization Method for formation UAVs"; 2nd International Conference on Electrical, Computer Engineering and Electronics (ICECEE 2015).

Hamed Rezaee, Farzaneh Abdollahi; "Synchronized Cross Coupled Sliding Mode Controllers for Cooperative UAVs with Communication Delays"; 51st IEEE Conference on Decision and Control; Dec. 10-13, 2012. Maui, Hawaii, USA.

S. Rayanchu, et al.; "Airshark: Detecting Non-WiFi RF Devices using Commodity WiFi Hardware," IMC '11 Proceedings of the 2011 ACM SIGCOMM conference on Internet measurement conference; pp. 137-154; Berlin, Germany—Nov. 2-4, 2011.

A. Patro, et al.; "AirTrack: Locating Non-WiFi Interferers using Commodity WiFi Hardware," ACM SIGMOBILE Mobile Computing and Communications Review; vol. 15 Issue 4, pp. 52-54; Oct. 2011.

K. Sayler, "A World of Proliferated Drones: A Technology Primer," https://www.cnas.org/publications/reports/a-world-of-proliferated-drones-a-technology-primer; Jun. 10, 2015.

T. Goodspeed, "Packets in Packets: Orson Welles' In-Band Signaling Attacks for Modern Radios," WOOT'11 Proceedings of the 5th USENIX conference on Offensive technologies; San Francisco, CA; 2011.

N.O. Tippenhauer, et al.; "On the Requirements for Successful GPS Spoofing Attacks," Conference: Proceedings of the 18th ACM Conference on Computer and Communications Security, CCS 2011, Chicago, Illinois, USA, Oct. 17-21, 2011.

N. Kothari, et al,; "Finding Protocol Manipulation Attacks," SIGCOMM '11 Proceedings of the ACM SIGCOMM 2011 conference pp. 26-37; Toronto, Ontario, Canada—Aug. 15-19, 2011.

J. Bellardo and S. Savage, "802.11 Denial-of-Service Attacks: Real Vulnerabilities and Practical Solutions," SSYM'03 Proceedings of the 12th conference on USENIX Security Symposium—vol. 12; pp. 2-2; Washington, DC—Aug. 4-8, 2003.

International Search Report, dated Jan. 11, 2017, International Pub. No. WO 2017/058966 A1 (Appl. No. PCT/US2016/054258).

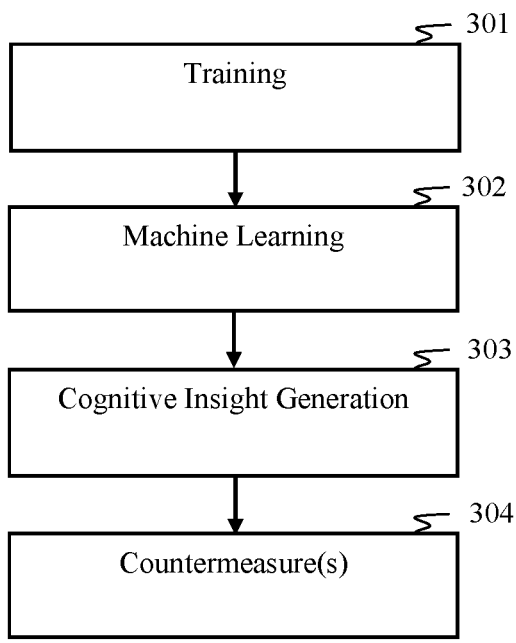
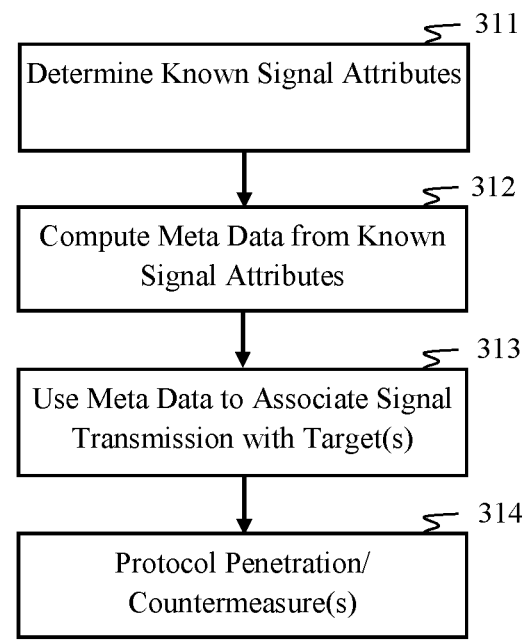
FIG. 3A
FIG. 3B

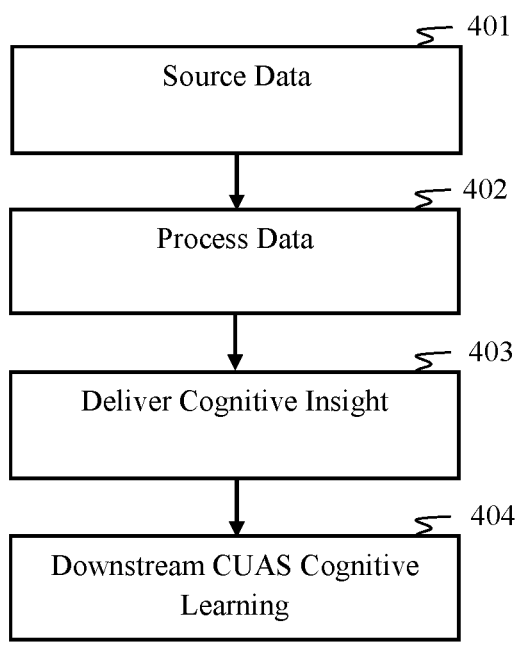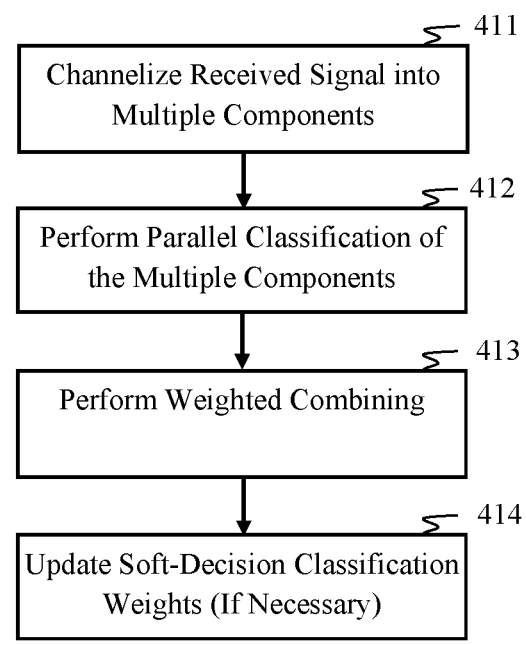
FIG. 4A
FIG. 4B

DETECTION, ANALYSIS, AND COUNTERMEASURES FOR RADIO TRANSCEIVERS

CROSS-REFERENCE TO RELATED APPLICATIONS

This application is a Continuation of U.S. patent application Ser. No. 17/340,712, filed on Jun. 7, 2021, now U.S. Pat. No. 11,595,149; which is a Continuation of U.S. patent application Ser. No. 16/157,615, filed on Oct. 11, 2018, now U.S. Pat. No. 11,032,022; which claims priority under 35 U.S.C. 119(e) to U.S. Provisional Application Ser. No. 62/570,768, filed Oct. 11, 2017; all of which are incorporated by reference in their entireties.

BACKGROUND

I. Field

The present invention relates to detecting, identifying, tracking, and enacting countermeasure against remote-controlled vehicles, such as unmanned autonomous vehicles (UAVs).

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

Techniques for disabling a UAV can include jamming its control signal with high-power radio frequency (RF) signals. Jamming is a Physical-Layer denial-of-service (DoS) attack that relies on transmitted radio signals to interfere with wireless transmissions whereby the attacker essentially spams the appropriate RF band with a much stronger signal than those used for network communications.

A UAV operator might employ an unconventional, and possibly unique, radio protocol to evade detection and countermeasures. Thus, there is a need in the art for a UAV detection, analysis, and countermeasure system capable of detecting, identifying, and responding to UAVs that employ unanticipated communication protocols. It would be useful for such a system to adapt to and learn from the devices it detects, such as to improve detection, identification, and/or countermeasures. Furthermore, a UAV operator might employ an autopilot or waypoint mode in which there is little to no radio communication between a UAV and its controller. Thus, there is a need for a UAV countermeasure system capable of configuring exploits to target a UAV system in which little to no initial information about its radio protocol is known.

One of the most difficult problems in Signals Intelligence is detecting, analyzing, and characterizing unknown signals. In large part, the difficulty stems from how most RF applications work—systems rely on prior knowledge to create a filter that detects a specific signal. Generally, human operators are needed to detect unknown signals, perform time consuming analysis, and develop a detection and demodulation scheme before downstream processing tasks occur. The human-driven approach can take weeks or months to complete. This means that new signal detection and analysis for electronic warfare and signal detection can become a major bottleneck for operations and intelligence gathering.

Cognitive radio has focused primarily on developing algorithms and capabilities that enable radios to be more aware of their environment. This awareness permits the radios to operate more effectively by performing auto-tuning, managing auto gain, detecting busy channels, finding open channels, and managing noise. During the last decade, more researchers have focused on using Machine Learning (ML) tools and techniques. ML, sometimes referred to as artificial intelligence (AI), expands and extends what cognitive radios can do. Some of these efforts have focused on developing complex algorithms to perform blind signal detection and/or blind signal analysis. The term 'blind' is used to indicate that the algorithm or system has little prior knowledge about the signals it is monitoring, such as specific frequencies or modulation schemes. However, no single algorithm has been found that is effective at blindly analyzing and managing all types of signals, frequencies, waveforms, and modulation types, and in all types of propagation environments (i.e., channels).

SUMMARY

Aspects disclosed herein pertain to a distributed sensor network, such as may be employed for detecting, tracking, identifying, and/or mitigating UAVs, such as unmanned aerial vehicles, autonomously navigated vehicles, and wireless remote-controlled vehicles. Such aspects may be applied broadly to distributed networks, such as Internet of Things (IoT) networks, wireless communications networks (e.g., radio access networks employed in any of the cellular standards, wireless local area network standards, personal area communications standards, vehicular access network standards), autonomous vehicle control networks, navigation systems, as well as other networks and systems.

Distributed networks present unique and complex resource and service interactions. For example, classification of data may take place at an analytics engine, such as a perceptual computing analytics, a sensor data analytics, and the like. Analytics engines may be hosted by a server in a cloud, at an edge processor (e.g., an edge server, a client device, remote sensors, other edge devices), or both.

The disposition of the data, such as analysis results, may be used by edge devices to provision an action, such as identifying a target UAV, geo-locating a UAV, geo-locating a UAV controller, tracking the UAV, identifying a cluster master in a swarm of UAVs, intercepting signals from a UAV, identifying jamming and other radio interference sources, identifying spoofed radio signals, excising undesired signals (e.g., interference, jamming, and/or other co-channel interference) from signals of interest, geo-locating jammers, spoofers, and/or other radio interference sources, enacting electronic countermeasures, and the like. The analytics engine may pre-trained through supervised machine learning using a set of predefined training data, such as pre-classified signals, data patterns, and the like.

A set of analytics engines hosted on multiple geographically distributed edge devices introduces certain challenges to classifying signals in a radio propagation environment. For example, sensors on different edge devices experience different channel conditions and receive different radio signals. In a hidden-node scenario, for example, an edge device might detect a UAV video uplink signal but not the downlink signal transmitted by the controller to the UAV. Proximity to interference sources, effects of multipath, and other local channel conditions can degrade radio reception at an edge device. Furthermore, sensor data analytics of a particular type might be suitable for some edge devices and unsuitable for other edge device due to their local channel conditions. Accordingly, aspects disclosed herein can provide a plurality of different data analytic techniques to be provisioned by each edge device based on at least its local channel conditions. The analysis results can be advantageously fused to provide for improved classification accuracy. Thus, some techniques described herein provide a method for an analytics engine hosted by an edge server to perform a first type of analysis based on first measured channel conditions, and perform a second type of analysis based on second measured channel conditions. Some techniques described herein provide a method of combining results from the first type of analysis performed by a first edge server with results from the second type of analysis performed by a second edge server in order to compute a classification (e.g., a cognitive profile, a cognitive insight, and the like).

In one aspect, a distributed machine-learning environment is provided amongst the edge devices to fuse at least some analysis results without requiring a remote central processor, such as a data center.

An analytics engine hosted by a central (e.g., cloud) server may use a more powerful model then an edge server, enabling classification using lower quality data. This central analytics engine may be trained using deep learning neural networks and a much larger training data set. Further, the cloud server may have significantly higher computing power and storage capacity compared to an edge server, allowing the operation of more powerful models. However, communication and processing latency should be considered, and the central-processing analytics resource should be provisioned in order to reduce negative impacts of classification delay on the objectives of the system. Thus, aspects disclosed herein provide for enabling edge devices to decide upon whether cloud processing is to be performed, and possibly which analytic processing is to be performed by the cloud. In one aspect, edge devices assess a target's speed and heading toward a protected area, compute a required decision time, compare the required decision time to cloud latency, and based on the comparison, either provision or bypass cloud analytics.

An edge server hosted analytics engine may provide near real-time actionable feedback to other edge servers in close network proximity. For example, an edge server may be connected to other edge servers through a fronthaul network with minimal network hops. In such aspects, a set of edge servers in close network proximity may self-organize as a network cluster to fuse analysis results from each edge server to generate a classification (e.g., a cognitive profile, a cognitive insight, etc.). In further aspects, edge servers may be configured to retrain each other and may disseminate supplemental or a new set of training data among themselves. Thus, some techniques described herein provide a method for an analytics engine hosted by an edge server to assist in training of an analytics engine hosted by another edge server.

The techniques may be used in any number of analytics engines, for example, in perceptual computing analytics or edge server hosted analytics engine/artificial intelligence, among others.

In one aspect of the disclosure, a computer-implementable method for generating a cognitive insight is performed by a counter-UAV system. The method comprises receiving training data based upon sensor measurements of at least one unmanned autonomous vehicle for processing in a cognitive learning and inference system. The system performs a plurality of machine learning operations on the training data to generate a cognitive profile of the at least one UAV. A cognitive insight is generated based upon the cognitive profile, and a countermeasure may be enacted against the UAV based upon the cognitive insight.

Distributed radio system, as well as other systems and methods that are relevant to this disclosure, is disclosed in U.S. Pat. Pub. No. 20150244430 and U.S. Pat. No. 8,670,390, which are incorporated by reference in their entireties. Software-defined radios, as well as other systems and methods that are relevant to this disclosure, are disclosed in U.S. Pat. Pub. Nos. 20150244430 and 20110292976, and U.S. Pat. No. 8,942,082, which are incorporated by reference in their entireties. Aspects of the disclosure can include blind-adaptive techniques and other apparatus and method embodiments disclosed in U.S. Pat. No. 7,965,761, which is incorporated by reference in its entirety. U.S. patent application Ser. Nos. 15/279,425, 62/233,982, 15/347,415, 15/268,992, and 15/218,609, and U.S. Pat. No. 8,254,847 are incorporated by reference in their entireties.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain aspects herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth herein.

BRIEF DESCRIPTION OF THE DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown.

It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

FIG. 3A is a flow diagram of a computer-implementable method performed by a UAV-detection network configured for generating a cognitive insight.

FIG. 3B is a flow diagram depicting a disclosed technique that can be employed for detecting, identifying, and characterizing unknown signals via signal features and meta features using machine learning.

FIG. 4A is a flow diagram that depicts a cognitive learning method in accordance with aspects of the disclosure.

FIG. 4B is a flow diagram that illustrates a classification method that can be performed in accordance with certain aspects of the disclosure.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
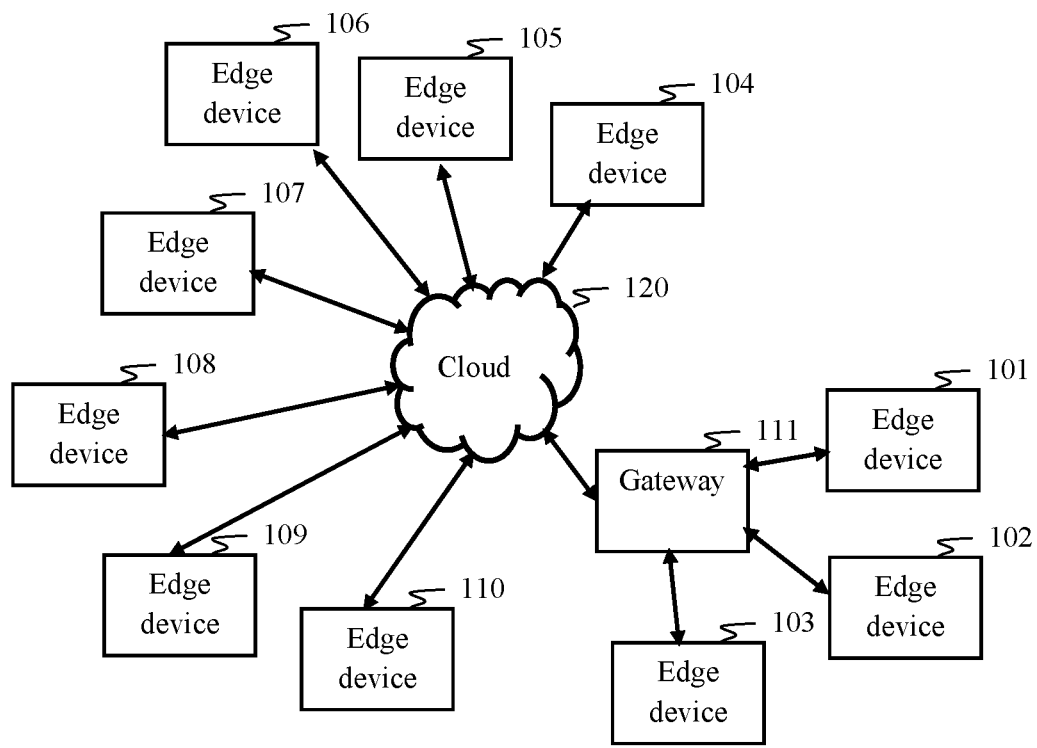
FIG. 1 is a block diagram of a distributed sensing and computing network in accordance with an exemplary aspect of the disclosure.

FIG. 1 is a drawing of a distributed sensing and computing network in which aspects of the disclosure can be employed. By way of example, but without limitation, a cloud 120 is communicatively coupled with a number of edge devices 101-110 in accordance with some aspects. The cloud 120 may represent the Internet, a local area network (LAN), and/or a wide area network (WAN). The cloud 120 may comprise fronthaul and backhaul networks. The cloud 120 can comprise a radio access network, such as a 4G, 5G, 6G, or similar wireless technologies standardized under telecommunications standards associations, such as the 3rd Generation Partnership Project (3GPP). The cloud 120 can comprise other wireless networks, such as mobile radio networks employed as vehicular area networks (VANs) (including vehicular ad-hoc networks, airborne relay networks, and the like), cooperative wireless networks, mesh networks, 60-GHz networks, and hybrid networks comprising multiple types of network access technologies, access points, and/or relay platforms.

The edge devices 101-110 may include any number of different types of devices grouped in various combinations. By way of example, but without limitation, the edge devices 101-110 can comprise radio receivers configured to detect radio signals in a predetermined geographical area or airspace and may be further configured to identify radio sources, track the radio sources, and possibly enact electronic countermeasures against radio sources that are determined to be a threat to assets in or near the predetermined geographical area or airspace. In some aspects, the edge devices 101-110 may be configured as components in an air-traffic control (ATC) system.

The edge devices 101-110 can comprise processing resources to perform data analytics. Analytics engines hosted by edge devices 101-110 may operate in conjunction with analytics engines hosted on cloud servers 204. Cloud servers 204 may employ analytics engines to operate on data collected by the edge devices 101-110 and may operate on analysis results produced by analytics engines hosted on edge devices 101-110. Cloud servers 204 may communicatively couple to the cloud 120 to provide data analytics services and the like to edge devices 101-110. In some aspects, Cloud servers 204 may couple to remote information sources via the cloud, such as (but not limited to) databases, third-party data services, media content, and/or remote sensors of various types.

Edge devices 101-110 may include Internet of Things (IoT) devices. Edge devices 101-110 can include radio transceivers, infrared sensors, chemical sensors, radiological sensors, bio-hazard sensors, acoustic sensors, cameras, radars, lidars, thermal sensors, weather sensors, and the like. Edge devices 101-110 can include navigation signal receivers, such as receivers configured to receive navigation signals from satellites and/or navigation beacons. Edge devices 101-110 can include personal communication devices (e.g., cellular handsets, user terminals, user equipments (UEs), personal digital assistants, wearable computing devices, wireless personal area network devices, personal computing devices, computer peripheral devices, and the like), environmental sensors, computers (e.g., client computers, servers, etc.), navigation devices (e.g., GPS or other navigation devices), embedded devices, vehicular wireless communication devices, cellular (e.g., Long Term Evolution (LTE) or the like) network infrastructure transceivers, Internet Service Provider (ISP) network infrastructure modems, routers, access points, base transceiver stations, eNodeBs, remote radio heads, airborne relays, airborne sensors, and the like. The edge devices 101-110, or subgroups thereof, may be in communication with the cloud 120 through wireless links 208, such as radio access network links and the like. Furthermore, a sub-network using wired or wireless links, may allow the edge devices 101-110 to communicate with each other, such as via a local area network, a wireless local area network, and the like.

The edge devices 101-110 may use a network device, such as a gateway 111, to communicate with the cloud 120. In some examples, a sub-network may couple one or more of the edge devices 101-110 to the gateway 111 using a wired and/or wireless connection. Any of the edge devices 101-110 and/or the gateway 111 may host an analytics engine for analyzing data from the edge devices 101-110, other sensors, and/or other data sources. If the gateway 111 hosts an analytics engine, it may process data and/or analysis results from the edge devices 101-110 to provide classification and other services.

In one aspect, the analytics engine hosted by the gateway 111 may classify received radio signals as UAV control signals or a UAV video feed by distinguishing those signals from other signals in the environment. The analytics engine might associate each classified signal with a radio transmitter based on detected radio signal characteristics from which target location and/or movement can be computed, and such characteristics may be used to remove other signals from analysis. The analytics engine might employ other data sources, such as radar data, camera images, acoustic signatures, and the like to help associate each classified signal with its radio transmitter and distinguish signals of interest from signals that are not of interest. The analytics engine might identify either or both UAV type and radio transmitter type based on data and/or analysis results from the edge devices 101-110. Furthermore, the analytics engine might identify the presence of a payload on the UAV and may possibly identify weight, size, and/or contents of the payload, such as via analysis of UAV flight behavior and/or remote-sensing imaging data (e.g., radar cross-section, thermal sensing, camera images, etc.). The analytics engine might employ external data sources, such as manufacturer-supplied data for the UAV and/or radio to aid in classifications described herein. The analytics engine may classify a UAV as a threat based on any combination of flight behavior, radio behavior, UAV payload features, and the like. In some aspects, the analytics engine can identify which UAV in a swarm is a master or control device based on analysis of flight behavior, communication behavior, responsiveness to electronic countermeasures, and/or external data. The analytics engine may determine a countermeasure to be deployed against the threat based on a combination of classification and heuristics. For example, UAV classification and radio classification might be used to select a corresponding countermeasure. In some aspects disclosed herein, at least some of the aforementioned gateway 111 analytics are performed by ad-hoc clusters of edge devices 101-110.

Although wireless networks and wired networks are described, any type of network may be used to couple the edge devices 101-110 to each other or to the gateway 111. A network or assembled group of edge devices 101-110 may have both wired and wireless connections, and may use both simultaneously between nodes, peers, and gateway devices. Further the network or assembled group of devices may use wired networks, wireless networks, or both, to communicate with the cloud, and any higher performance computing devices that may be participating to deliver services or support the aspects disclosed herein. Each of these edge devices 101-110 may be in communication with other edge devices 101-110, with data centers, including cloud servers 204, or combinations thereof.

In one aspect, an analytics engine may be hosted by the gateway 111 to provide classification and prediction services for a counter unmanned aerial system (CUAS). As UAVs operate within a detection zone, the analytics engine may predict, based on speed and heading, how long a target UAV will take to reach the perimeter of a protected zone. Based on classification of the UAV and its radio system, associated electronic countermeasures may be selected, and the predicted success of those countermeasures along with predicted time to enact those countermeasures may then be used to select particular countermeasures to be enacted against the UAV. Electronic countermeasures may be performed by specific ones of the edge devices 101-110 based on proximity to the UAV and/or its controller.

In some aspects, provided there is sufficient time to develop further analyses, the analytics engine in the gateway 111 may send the data to an analytics engine hosted by a cloud server 204. The cloud server 204 may then perform the classification in the analytics engine it hosts, and return the classification to the gateway 111. The gateway 111 may then pass the classification or instructions based on the classification to the edge devices 101-110 for performing additional detection and/or enacting countermeasures. Furthermore, the gateway 111 may access the data associated with the UAV to train the gateway's 212 analytics engine. This training may similarly be performed at analytics engines hosted on the edge devices 101-110.

The analytics engine hosted by the cloud server 204 may be used to proactively train an analytics engine hosted by the edge devices 101-110 to increase the prediction accuracies. This allows the implementation of a more economical client or edge hosted machine learning analytics engine that has increasing prediction accuracies and near real-time actionable items feedback. For the CUAS, improved prediction accuracies can reduce the time to identify and mitigate a threat.

The techniques provide a method to enable an analytics engine hosted by cloud server to train a less powerful analytics engine hosted by an edge device. As described herein, the performance or prediction accuracy, of the analytics engine hosted by the edge device may progressively improve and converge towards the classification accuracy of the analytics engine hosted by the cloud server. Thus, over time, more classifications may be made by edge devices 101-110 than the cloud analytics engine.

Further, the training process can be employed in an ad-hoc peer-to-peer configuration (or other local network configurations) across clusters of edge devices 101-110 and between clusters. This enables scaling of the training across analytics engines hosted by edge servers. For example, one edge-hosted analytics engine may train any number of other edge-hosted analytics engines, and this training may be performed via short-range local area communications to avoid loading the backhaul network. The techniques are applicable for training any analytics engine hosted by an edge server irrespective of how the analytics algorithm is implemented. A machine learning algorithm may subsequently be used with data and classifications received from an analytics engine hosted on the gateway and/or cloud server to optimize edge-hosted analytics performance.

It should be appreciated that a large number of edge devices 101-110 may be communicatively coupled via the cloud 120. This may allow different edge devices 101-110 to request or provide information to other devices autonomously. In some aspects, multiple edge devices 101-110 may jointly perform analytics wherein each device performs a different one of a plurality of analytics processes. Multiple devices may jointly decide on the distribution of analytics tasks amongst themselves, each device may select an analytics task to perform independent of the other devices, or some combination thereof may be implemented by edge devices 101-110 cooperatively processing information. In accordance with some aspects, edge devices 101-110 may select analytics processes it performs based on local channel conditions of the radio signals it is processing, the local channel conditions comprising at least one of received signal power, signal-to-noise measurements, channel state information, bit error rate, packet error rate, and the like.

Clusters of edge devices 101-110 may be equipped to communicate with the cloud 120. This may allow the edge devices 101-110 to form a cluster of devices, allowing them to function as a single device, which may be termed a fog device. Edge devices 101-110 may form clusters by querying amongst themselves to determine which devices are receiving particular radio signals, and selection of the cluster may be based on the signal quality of radio signals of interest received by the devices. In some aspects, geographically distributed edge devices 101-110 may be selected to provide the cluster with improved geolocating and ranging of a target UAV. Edge devices 101-110 may be added to and removed from a cluster as a target UAV moves, such as to provide for improved tracking and observation of the target.

Figure 2:
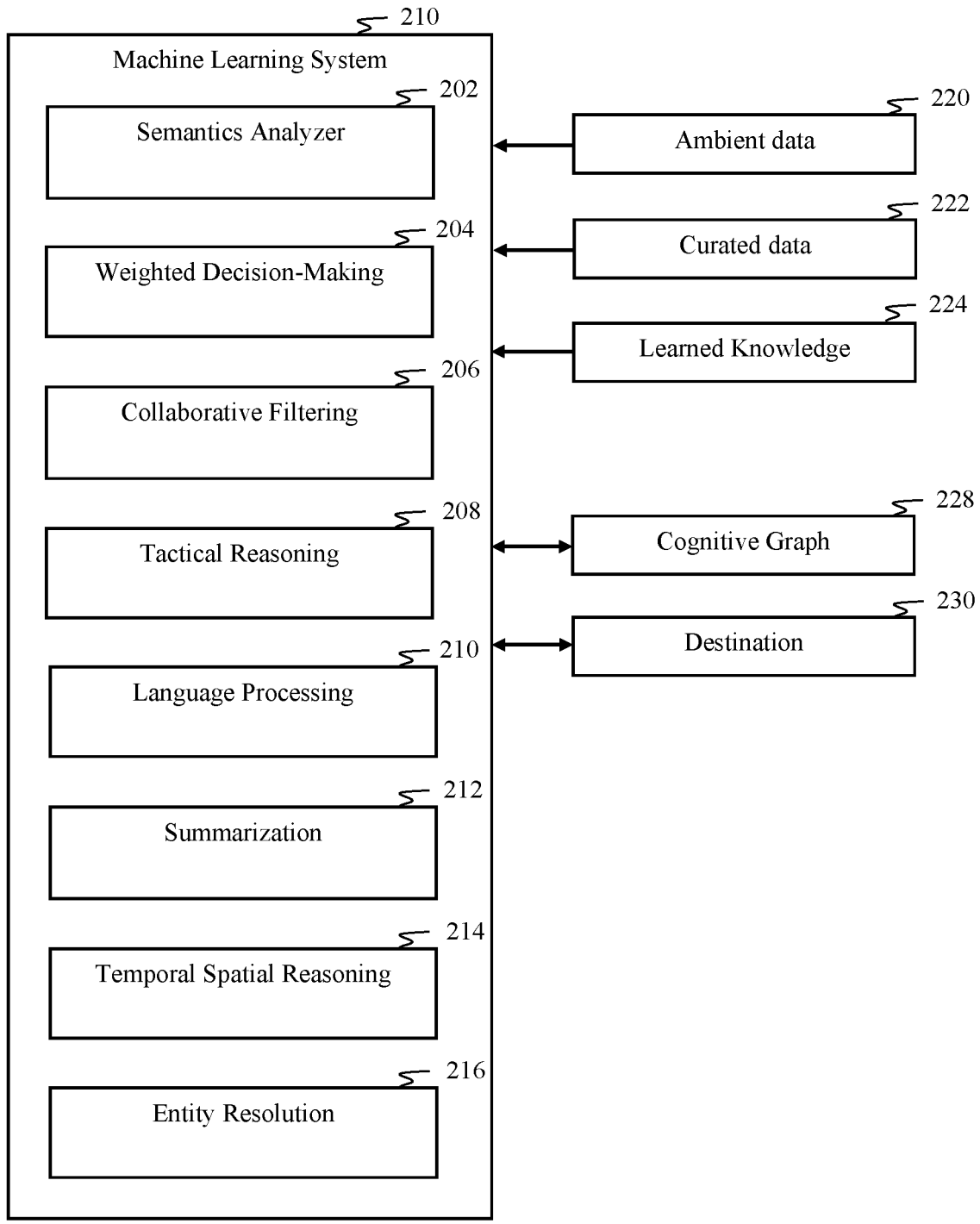
FIG. 2 is a block diagram of a machine-learning system implemented in accordance with aspects disclosed herein.

FIG. 2 is a block diagram of a machine-learning system implemented in accordance with aspects disclosed herein. The system can be implemented to incorporate a variety of processes, including semantic analysis 202, weighted decision-making 204, collaborative filtering 206, tactical reasoning 208, machine language processing 210, summarization 212, temporal/spatial reasoning 214, and entity resolution 216 to generate cognitive insights.

Semantic analysis 202 broadly refers to performing various analysis operations to achieve a semantic level of understanding about language by relating syntactic structures. In aspects disclosed herein, language pertains to communications between a radio controller and a UAV. Such communications can be embodied in radio control and management signaling (including synchronization, acquisition, handshaking, session management, resource management, error detection/correction, reference signaling, and other radio control-plane signaling), and user-plane signaling (such as data payloads, application-layer control and management, and UAV-control signaling). In certain aspects, various syntactic structures are related from the levels of phrases, clauses, sentences, paragraphs, and the conversation formats between the client and server (e.g., UAV and controller), to the level of the body of content as a whole. In aspects disclosed herein, "words" of a radio transmission can comprise data sequences, and various data patterns can constitute various words. Phrases, clauses, sentences, paragraphs, and conversations can be interpreted as sequences and patterns of such words. Conversation formats, including the expected format of responses, salutations, acknowledgements, authentication messages, heartbeat signaling, any of various types of queries, session management signaling, resource grants, hashes, etc., are included as syntactic structures. Also, other conversation characteristics, such as frequency and timing of queries and responses, as well as the coding and modulation of specific types of phrases in a conversation, are regarded as syntactic structures herein.

In various aspects, the semantic analysis 202 includes processing an intercepted radio signal to parse it into its individual parts, tag sentence elements that are related to predetermined items of interest (e.g., UAV communications), identify dependencies between individual words or other signal patterns, and perform co-reference resolution. In some aspects, data patterns in the radio transmission enable edge devices 101-110 to detect the presence of such patterns without having to demodulate the radio signal. For example, Fourier analysis can identify repeated signal patterns. In some aspects, known data patterns in the radio signal can be exploited by the receiver to decrypt or otherwise decode intercepted signals. For example, some versions of the Lightbridge radio protocol comprises long sequences of data symbols from which the "encryption" code can be deciphered. Known data sequences (e.g., words) employed in preambles, headers, acknowledgements, and the like can be detected to identify the type of communications without requiring demodulation of the signal, and/or can be employed to facilitate demodulation.

By way of example, UAV control signals can comprise signal structure that differentiates them from other signal types. For example, a control signal can typically have smaller bandwidth and possibly a periodic transmission characteristic, as well as other characteristics, that can be used by an analytics engine to differentiate it from media transmissions. The semantic analysis 202 can exploit known signaling characteristics, such as field length, known transmission sequences used for establishing and/or maintaining a link, formats for known responses for control-plane signaling, and various other known signaling formats.

A preamble is a signal used in network communications to synchronize transmission timing between two or more systems. In general, preamble is a synonym for "introduction." The role of the preamble is to define a specific series of transmission criteria that is understood to mean "someone is about to transmit data." Preambles typically employ a low-complexity modulation format, such as bpsk, and its constant-modulus property can be used to distinguish the preamble from other parts of a transmission.

At the network layer, a packet header contains control information, such as addressing, and is located at the beginning of the PDU. A trailer contains control information added to the end of the PDU. Known field lengths in the header and/or trailer, as well as expected field values can be used to identify a particular communication signal, communication type, or at least separate the signal from other signals.

Semantics analysis can employ a logical ruleset engine that develops and/or stores the logical rules (e.g., grammar rules or grammar shapes) which can be used to detect and identify communication from intercepted radio signals. Grammar can be defined as the whole system and structure of a language or of languages in general, usually taken as consisting of syntax and morphology (including inflections) and sometimes also phonology and semantics. Syntax is the arrangement of words and phrases to create well-formed sentences in a language. The concept of well-formed sentences, as used herein, can comprise signaling format, such as defined by a radio network communications standard. Grammar can also comprise the principles or rules of a technique, such as a remote control technique for guiding a UAV, the technique being reflected in the data format (e.g., words) of the data transmission, and possibly providing physical characteristics of the transmitted signal, which can be measured and processed without demodulating the signal in order to identify the type of data being transmitted. Phonology is ordinarily defined as the system of relationships among the speech sounds that constitute the fundamental components of language. In aspects disclosed herein, phonology can comprise relationships between data bits, data symbols, and data words that constitute fundamental components of a communication protocol.

Semantics comprises a number of branches and sub-branches of semantics, including formal semantics, which studies the logical aspects of meaning, such as sense, reference, implication, and logical form; lexical semantics, which studies word meanings and word relations; and conceptual semantics, which studies the cognitive structure of meaning. As used herein, similar data-word structures may be used to convey different information depending on the context in which the words are used. For example, control signaling features for controlling a UAV may comprise similar data words used to provide network management and control of the radio communications. However, whereas network management and control features occupy known control-signaling locations in a radio or network signal, UAV control signaling features are likely to reside in the data payload of a packet and/or frame. Besides location, the frequency of such words and proximity to other words (and/or signal features) can differentiate between similar words used for different purposes.

Weighted decision-making 204 broadly refers to performing multi-criteria decision making operations to achieve a given goal or target objective. In various aspects, one or more weighted decision-making 204 processes are implemented by the system to define predetermined goals, which in turn contribute to the generation of a cognitive insight. For example, goals for protecting an asset include minimizing the use of kinetic countermeasures, minimizing interference with other radio systems, minimizing collateral damage, ensuring that white-listed UAVs are not harmed, and keeping threats outside a predetermined perimeter. In this example, it will be appreciated that certain goals may be in conflict with another. As a result, a cognitive insight may indicate a kinetic countermeasure be enacted against a fast-moving UAV while it is in an outer zone. While this may result in collateral damage, it may provide a better outcome given that non-kinetic countermeasures may not be effective in protecting the asset. If the UAV is controlled by a WiFi or LTE signal, a cognitive insight might indicate that interrupting other radio systems by transmitting a jamming signal might be acceptable given the prospect of collateral damage due to enacting kinetic countermeasures.

Collaborative filtering 206, as used herein, broadly refers to the process of filtering for information or patterns through the collaborative involvement of multiple agents, sensors, data sources, and so forth. The application collaborative filtering 206 processes can involve very large and diverse data sets in addition to remote-sensing data, including (but not limited to) UAV device technical data, radio transceiver technical data, weather, newsfeeds, public forums, social media and other forms of Internet chatter. Collaborative filtering 206 also refers to the process of making automatic predictions by collecting information from many devices, sensors, and/or external data sources. For example, if a terrorist attack is reported against other assets, the system may employ an escalated alert state that reduces a threshold for determining that a UAV is a threat.

Tactical reasoning 208 broadly refers to simulating the human ability to make deductions from common facts they inherently know. Such deductions may be made from inherent knowledge about the physical properties, purpose, intentions, and possible behavior of a UAV, such as based on its flight, its payload, location, the location of its controller, and/or the radio protocol employed to control it. In various aspects pertaining to analyzing radio communications, tactical reasoning 208 processes are implemented to assist the system in understanding and disambiguating words within a predetermined context. It will be appreciated that if the context of a word is better understood, then a common sense understanding of the word can then be used to assist in evaluating intent of the UAV. In various aspects, this better or more accurate understanding of the context of a word, and its related information, allows the system to make more accurate deductions about the radio protocol, which are in turn used to generate cognitive insights for generating a protocol manipulation or other electronic countermeasure.

Machine language processing (MLP) 210 broadly refers to interactions with a system through the use of data communication standards, including network standards (e.g., radio communication standards) and UAV-control standards. In various aspects, MLP 210 processes are implemented to achieve language understanding (for either or both the radio protocol and the UAV-control protocol), which enables it to not only derive meaning from intercepted signals, but to also generate electronic countermeasures, such as to hijack the UAV or otherwise control the UAV. Summarization 212, as used herein, broadly refers to processing a set of information, organizing and ranking it, and then generating a corresponding summary. As an example, sensor data for a set of UAVs can be processed to identify their likely purpose, potential threat, and associated observations, which are then ranked and presented to a graphical user interface (GUI). In certain aspects, various summarization 212 processes are implemented to generate cognitive insights.

Temporal/spatial reasoning 214 broadly refers to reasoning based upon qualitative abstractions of temporal and spatial aspects of tactical knowledge. For example, it is common for a predetermined set of data to change over time. Likewise, other attributes, such as its associated metadata, may likewise change over time. As a result, these changes may affect the context of the data. By way of example, the context of a UAV operating late at night may be quite different than a UAV operating in the same manner during normal business hours.

Entity resolution 216 broadly refers to the process of finding elements in a set of data that refer to the same entity across different data sources. In various aspects, the entity resolution 216 process is implemented to associate certain received data with specific UAVs. For example, radio transmission meta data (e.g., frequency shift, phase offset, delay, angle of arrival, signal strength, change in frequency shift, change in phase offset, change in delay, change in angle of arrival, change in signal strength) may be processed with other sensor data (e.g., radar, lidar, optical images, acoustic signatures, etc.) to associate radio signals with specific UAVs and/or controllers.

It will be appreciated that the implementation of one or more of the semantic analysis 202, weighted decision-making 204, collaborative filtering 206, tactical reasoning 208, machine language processing 210, summarization 212, temporal/spatial reasoning 214, and entity resolution 216 processes by the system can facilitate the generation of a semantic, cognitive model.

In certain aspects, the system receives ambient data 220, curated data 222, and learned knowledge 224, which is then processed to generate one or more cognitive graphs 228. In turn, the one or more cognitive graphs 228 are further used by the system to generate cognitive insight streams, which are then delivered to one or more destinations 230. As used herein, ambient signals 220 broadly refer to input signals, or other data streams, that may contain data providing additional insight or context to the curated data 222, and learned knowledge 224. For example, ambient data may allow the system to understand that a UAV is currently being controlled by a user at a specific geographical location within a detection perimeter, the UAV is registered to a particular company authorized to perform package delivery services, and the particular UAV model is designed to carry a payload up to 10 lbs. To continue the example, there is a difference between the UAV being operated during normal business hours along an expected flight path and being operated after business hours and flying low to evade detection.

In various aspects, the curated data 222 may include structured, semi-structured, unstructured, public, private, streaming, device or other types of data. In various aspects, the learned knowledge 224 is based upon past observations and feedback from the presentation of prior cognitive insight streams and decisions. In certain aspects, the learned knowledge 224 is provided via a feedback loop that provides the learned knowledge 224 in the form of a learning stream of data. By way of example, the responsiveness of UAVs to selected ECMs can be used to update ECM classifications indexed by UAV and/or communication types.

A cognitive graph 228 refers to a representation of expert knowledge associated with UAVs and communication devices/protocols over a period of time, to depict relationships between radio signals, places, times, device uses, and behavior patterns. As such, it is a machine-readable formalism for knowledge representation that provides a common framework allowing data and knowledge to be shared and reused across devices, applications, and networks. In various aspects, the information contained in, and referenced by, a cognitive graph 228 is derived from many sources, such as curated data 222. In some aspects, the cognitive graph 228 assists in the identification and organization of information associated with how detected communication signals ultimately relate to security threats. In various aspects, the cognitive graph 228 enables automated agents to access the sensor data, as well as remote data sources, more intelligently, and enumerate inferences through utilization of curated, structured data 222.

In certain aspects, the cognitive graph 228 not only elicits and maps expert knowledge by deriving associations from data, it also renders higher-level insights and accounts for knowledge creation through collaborative knowledge modeling. In various aspects, the cognitive graph 228 is a machine-readable, declarative memory system that stores and learns both episodic memory (e.g., specific experiences associated with an individual UAV, UAV type, and/or radio protocol), and semantic memory, which stores factual information (e.g., UAV and transceiver technical specifications, operating system technical specifications, application software technical specifications, communication protocol technical specifications, etc.). For example, the cognitive graph 228 may indicate that a particular model of UAV has a high-capacity payload, and that such UAVs normally employ a specific radio communication protocol. Furthermore, the cognitive graph 228 may know that terrorists most often used that model of UAV to conduct attacks.

In certain aspects, a cognitive insight stream is bidirectional and supports flows of information both to and from destinations 230. For example, the first flow may be generated in response to identifying a threat, and target UAV information is then delivered to one or more destinations 230. The second flow may be generated in response to how the threat is dealt with, and the responsiveness of the target UAV to any countermeasures. This results in the provision of information to the system. In response, the system processes that information in the context of what it knows about the target UAV, and provides additional information to the destination, such as an adaptation to the countermeasure(s).

In some aspects, the cognitive insight stream may include a stream of visualized insights. As used herein, visualized insights broadly refers to cognitive insights that are presented in a visual manner, such as a map, an infographic, images, animations, and so forth. In various aspects, these visualized insights may include certain cognitive insights, such as predicted course and time of arrival of the target UAV, likelihood that the target UAV is a threat, deadlines to deploy countermeasures of various types. The cognitive insight stream is generated by various cognitive agents, which are applied to various sources, datasets, and cognitive graphs. As used herein, a cognitive agent broadly refers to a computer program that performs a task with minimum specific directions from users and learns from each interaction with data.

In some aspects, the system delivers Cognition as a Service (CaaS). As such, it provides a cloud-based development and execution platform that enables various cognitive applications and services to function more intelligently. In certain aspects, cognitive applications powered by the the system are able to think and interact with system users as intelligent virtual assistants. As a result, users are able to interact with such cognitive applications by asking them questions and giving them commands. In response, these cognitive applications can assist the user in enhancing their situational awareness and developing actionable information regarding detected threats.

In these and other aspects, the system can operate as an analytics platform to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics. In various aspects, users submit queries and computation requests in a natural language format to the system. In response, they are provided with a ranked list of results and aggregated information with useful links and pertinent visualizations through a graphical representation.

FIG. 3A is a flow diagram of a computer-implementable method performed by a UAV-detection network configured for generating a cognitive insight. A training step 301 comprises receiving training data based upon sensor measurements of at least one UAV for processing in a cognitive learning and inference system. A machine-learning operation 302 comprises performing a plurality of machine learning operations on the training data for generating a cognitive profile of the at least one UAV. Cognitive insight generation 303 comprises generating a cognitive insight based upon the cognitive profile generated using the plurality of machine learning operations. Based on the cognitive insight, one or more countermeasures may be enacted 304 against the UAV.

The training data typically consists of a set of training examples, with each example consisting of an input object (e.g., a vector) and a desired output value (e.g., a supervisory signal). In various aspects, a supervised learning algorithm is implemented to analyze the training data and produce an inferred function, which can be used for mapping new examples. As likewise used herein, an unsupervised learning machine learning algorithm broadly refers to a machine learning approach for finding non-obvious or hidden structures within a set of unlabeled data. In various aspects, the unsupervised learning machine learning algorithm is not given a set of training examples. Instead, it attempts to summarize and explain key features of the data it processes.

With reference to FIG. 3B, disclosed techniques comprise detecting, identifying, and characterizing unknown signals via signal features and meta features using machine learning. In some aspects, known signal structure can be exploited to detect, identify, and characterize radio control (downlink) signals and uplink (e.g., video, data, control) signals. Based on any combination of sensor data, learned knowledge, and a prior information about a UAV of interest, signal attributes for uplink and/or downlink signals are determined 311. In some cases, symbol streams of these signals possess properties that can be used to detect and differentiate them from other signals in the environment. Steps 311 and/or 312 can comprise the following aspects.

Some aspect can employ constant modulus algorithms (CMAs), which exploit the constant modulus of symbol streams or portions thereof, such as preambles, headers, reference signals, network management signals, etc. Since the CM envelope resists cochannel interference and noise, it is typically used for signal acquisition and synchronization. CM is also used for channel sounding (e.g., pilot tones and other training sequences) and reference signals.

In some aspects, frame-synchronous feature extraction (FSFE) algorithms are employed, which exploit the structure of repeated signals. This can be used to extract information from signals with repeated spreading codes, including regular frequency hopping sequences. Some aspects employ partially-blind algorithms, which can use geolocation and/or baseband symbol data provided from external sources (e.g, radar (and other detection and ranging systems), GPS data (e.g., from the target UAV and/or from nearby sensors), and external databases (e.g., radio standards, UAV manufacturer's technical data (e.g., including UAV-control data format, video data format, communication protocol, and the like). Signals of interest can possesses internal fields that can be exploited to aid detection, identification and demodulation, such as repeated user-data sequences, control-data sequences, and network-management data.

In some aspects, a unique radio-frequency (RF) fingerprint from the UAV transmitter can be measured, and this RF fingerprint can be used to separate signals of interest from other signals and track the UAV. The RF fingerprint can be detected and recorded in the time-domain based on transient features of a signal's shape, and/or in the frequency-domain when known data values are transmitted, wherein the signal can be spectrally decomposed into one or more components that reveal a unique spectral fingerprint.

In some aspects, detecting, identifying, and characterizing a UAV's transmission can exploit known signal features (e.g., training sequences, pilot tones, reference signals, etc.) to estimate MIMO signatures. Such MIMO signatures can be used to filter received signals in order to differentiate signals from a UAV of interest from other signals and remove co-channel interference. A MIMO signature can be regarded as a known signal feature from which other signal features may be determined 311, and a MIMO signature can be regarded as meta data computed from other signal attributes 312. Such MIMO processing can be advantageously performed in a distributed antenna system comprising multiple edge devices, and the processing may be implemented by any combination of distributed and centralized processing.

Machine learning 302 comprises generating a cognitive profile. As used herein, a cognitive profile refers to an instance of a cognitive persona that references device-specific data associated with a UAV. Device-specific data may include UAV manufacturer, UAV model, computer operating system, operating system version, installed software, device identifiers (e.g., MAC address, IP address, subscriber ID number, phone number, etc.), controller specifications (including hardware and software specifications), UAV payload capacity, flight performance capabilities, camera specifications, transceiver specifications, communication formats, etc. In certain aspects, the cognitive profile may include data associated with a device's interaction with the CUAS, such as geolocation data from remote sensors (e.g., radar, lidar, acoustical sensors, optical sensors, cameras, GPS data), frequency offsets, time offsets, phase offsets, received signal power (and rates of change of those measurements), and responsiveness of similar UAVs to countermeasures, as well as other (possibly) related cognitive insights. In various aspects, the device data may be distributed. Thus, subsets of the distributed device data may be logically aggregated to generate one or more cognitive profiles, each of which is associated with the UAV. In various aspects, the UAV's interaction with a CUAS may be provided as feedback data.

In some aspects, the cognitive profile comprises metadata of a received signal. The metadata can include:
   a) the position, transmit power, frequency, phase, and delay for any target transmitter (e.g., UAV);
   b) the position, orientation, phase, and delay of the receiver(s) (e.g., edge devices); and
   c) the received signal's time offset, received incident power, line of bearing, direction of arrival, frequency, carrier phase, and deltas of any of the aforementioned signal features.

To generate a cognitive profile for a UAV of interest, meta data can be used to associate particular received signals (and thus, signal and/or communication features) with the UAV of interest 313.

For example, when multiple spatially separated or geographically separated radio receivers (e.g., edge devices) are employed for receiving radio transmissions from either or both the UAV and its controller, differences in signal timing offset, frequency shift, phase, and power of the received transmission from the different radio receivers can constitute a spatial signature associated with the location of the transmitter. The spatial signature may be compared with radar data and/or other remote-sensing data, such as to assist in associating transmissions with a particular target 313. This signature can be used to discriminate between signals of interest and other signals. Furthermore, a clock reference and location data for each of the receivers can be used to geolocate the transmitter. Any movement of the transmitter can produce uniquely identifying variations in the signal timing offset, frequency shift, phase, and/or power of the received transmission, and such variations can be used to further distinguish signals of interest from other signals (e.g., signals not of interest). Such variations can be processed to compute the UAV's movement, including changes in altitude and course. Thus, it can be advantageous to employ a widely distributed network of radio receivers (e.g., edge devices). Aspects disclosed herein can be used to identify radio sources that are not of interest in order to remove corresponding signals from the received signals. For example, successive interference cancellation or any advanced receiver structure may be employed to reduce the effect of such co-channel interference.

Further to the process of machine learning 302, only those received signals with metadata corresponding to a UAV of interest (or at least having metadata that does not disqualify signals from being transmitted by the UAV of interest) need to be further processed (e.g., step 314) to examine the content and structure of the communications (e.g., enable protocol penetration) and/or develop electronic countermeasures. This effects intelligent discrimination through physically corroborative (or negating) evidentiary observation of properties necessarily associated with the signal (metadata) that are unrelated to its information content (message). The information contained in the transmission may be extracted to further develop the cognitive profile, and may be used subsequently to formulate electronic countermeasures against the UAV.

With respect to step 314, it can be useful to classify the received signals with respect to radio protocol classification, such as to effect deeper protocol penetration and/or select associated countermeasures. In some aspects, when a received signal does not match a known radio protocol classification, generalized signal classifications can be used. Such generalized signal classifications might include CDMA, OFDM, SC-FDMA (e.g., CI-OFDM), DSSS, FHSS, and so on. Protocol penetration and/or electronic countermeasure development can be implemented based on the generalized signal classification.

Machine learning classifiers employed in step 314 can be trained to classify signal features (and/or communication behavior, such as conversations) through a supervised learning technique that provides exposure to examples that have already been correctly classified and labeled. Such classifiers can categorize signals not related to a UAV of interest to help classify signal features and communication protocols, and generally help to handle and organize an ever-increasing number of communication protocols and signaling formats. Examples of such classifiers include the Naive Bayes classifier, linear regression, polynomial regression, and neural networks. These types of classifiers can include different modes of operation such as a training mode and a classifying/querying mode. When operating in a training mode, a classifier reads sensor data examples with categories from a set of training data that have already been correctly classified and labeled, and it saves the training results. When operating in a classifying/querying mode, a classifier receives a query (i.e., query sensor data input to be classified), and leverages the training results previously obtained to calculate a best-match category with which to match the query.

In aspects disclosed herein, machine learning algorithms can be implemented with a cognitive learning technique. A supervised learning machine learning algorithm may be implemented with a direct correlations cognitive learning technique. An unsupervised learning machine learning algorithm may be implemented with a patterns and concepts cognitive learning technique, a behavior cognitive learning technique, or both. A probabilistic reasoning machine learning algorithm may be implemented with a concept entailment cognitive learning technique, a contextual recommendation cognitive learning technique, or both.

As used herein, a supervised learning machine learning algorithm broadly refers to a machine learning approach for inferring a function from labeled training data. The training data typically consists of a set of training examples, with each example consisting of an input object (e.g., a vector) and a desired output value (e.g., a supervisory signal). In various embodiments, a supervised learning algorithm is implemented to analyze the training data and produce an inferred function, which can be used for mapping new examples. An unsupervised learning machine learning algorithm broadly refers to a machine learning approach for finding non-obvious or hidden structures within a set of unlabeled data. In various aspects, the unsupervised learning machine learning algorithm is not given a set of training examples. Instead, it attempts to summarize and explain key features of the data it processes.

Examples of unsupervised learning approaches include clustering (e.g., k-means, mixture models, hierarchical clustering, etc.) and latent variable models (e.g., expectation-maximization algorithms, method of moments, blind signal separation techniques, etc.). A probabilistic reasoning machine learning algorithm broadly refers to a machine learning approach that combines the ability of probability theory to handle uncertainty with the ability of deductive logic to exploit structure. More specifically, probabilistic reasoning attempts to find a natural extension of traditional logic truth tables. The results they define are derived through probabilistic expressions instead.

In some aspects, reinforcement learning approaches can be implemented in combination with a patterns and concepts, a behavior, a concept entailment, or a contextualization recommendation cognitive learning technique when performing cognitive learning operations. As used herein, reinforcement learning broadly refers to machine learning approaches in which software agents take actions within an environment to maximize a notion of cumulative reward. Such reinforcement approaches are commonly used in game theory, control theory, operations research, information theory, simulation-based optimization, multi-agent systems, swarm intelligence, statistics, and genetic algorithms.

In certain embodiments, a particular cognitive learning technique may include certain aspects of a secondary cognitive learning style, aspects of a secondary learning category, or a combination thereof. As an example, the patterns and concepts cognitive learning technique may include implementation of certain aspects of the direct correlations and concept entailment cognitive learning techniques, and by extension, implementation of certain aspects of the declared and inferred cognitive learning styles. In various aspects, the data-based cognitive learning category, machine learning algorithms, and the interaction-based cognitive learning category are respectively associated with the source, process and deliver steps of a cognitive learning process.

As used herein, a cognitive learning process broadly refers to a series of cognitive learning steps that produce a cognitive learning result. With respect to FIG. 4A, a source step 401 of a cognitive learning process broadly refers to operations associated with the acquisition of data used to perform a cognitive learning operation. Likewise, as used herein, a process step 402 of a cognitive learning process broadly refers to the use of individual machine learning algorithms to perform cognitive learning operations. As likewise used herein, a deliver step 403 of a cognitive learning process broadly refers to the delivery of a cognitive insight, which results in an interaction. Information related to, or resulting from, the interaction is then used by the CUAS to perform cognitive learning operations 404.

Step 404 can comprise provisioning the cognitive insights in a CUAS receiving feedback information related to a particular UAV. In one aspect, the feedback information is used to revise or modify a particular cognitive persona of the UAV. In another embodiment, the feedback information is used to revise or modify a cognitive profile associated with the UAV. In yet another aspect, the feedback information is used to create a new cognitive profile, which can be stored in a cognitive profiles repository. In still yet another aspect, the feedback information is used to create one or more associated cognitive profiles that inherit a common set of attributes from a source cognitive profile. In another aspect, the feedback information is used to create a new cognitive profile that combines attributes from two or more source cognitive profiles.

While cognitive personas and cognitive profiles are described herein with reference to UAVs, it should be appreciated that cognitive personas and/or cognitive profiles may be developed and adapted for particular radio communication systems, devices, and protocols. To be clear, the descriptions herein that reference UAVs can be made in reference to radio transceivers in general, and such disclosures herein are not limited to UAVs. In various aspects, the cognitive insight is delivered to a device, an application, a service, a process, a user, or a combination thereof. In some aspects, the resulting interaction information is likewise received by a CUAS from a device, an application, a service, a process, a user, or a combination thereof. In some aspects, the resulting interaction information is provided in the form of feedback data to the CUAS.

FIG. 4B illustrates a classification method that can be performed in accordance with certain aspects of the disclosure. A received signal is channelized or broken down into data fragments 411, which can then be processed independently and in parallel 412. Different classification algorithms may be performed in 412, and the results combined 413 in a subsequent decision step to produce a classification result. Based on a combination of the classification result and feedback, confidence weights (e.g., soft-decision weights) for each of classification algorithms may be updated 414.

A variety of different channelization methods can be implemented in 411, including time-domain channelization, frequency-domain channelization methods, or mixed time-frequency channelizations, such as wavelet-based channelizers. The channelizer downconverts, digitizes, and channelizes the received signals. An exemplary channelizer uses Fast-Fourier Transform (FFT) operations. For example, the channelizer may first apply a zero-padded FFT and a rectangular window to each block of data symbols. The channelizer then selects a number of output bins for use in subsequent adaptive processing and machine learning algorithms. In one aspect, the output channelizer bins may be preselected (e.g., to reduce complexity of the channelization operation, such as via sparse FFT methods). In other aspects, the output channelizer bins are adaptively selected, possibly based on feedback information.

With respect to 412, different data fragments may be processed in parallel using different algorithms. In some aspects, the same fragment of a signal of interest may be processed using different algorithms, such as when the same signal fragment is received by different receivers. Each receiver may employ a predetermined algorithm, or each receiver may select an algorithm depending on some quality metric, such as received signal strength, detected interference, SNR, channel state information, as well as other metrics. Different receiver types (such as may be indicated by the number of spatial degrees of freedom) may determine which algorithms are employed. Different algorithms and different machine learning approaches, such as a random forest and a deep learning network, may run in parallel for analyzing the same features. The algorithms can run in parallel to feed decisions points, which may trigger an additional parallel cascade of algorithms. Each algorithm can be dynamically weighted based on various rules that can be injected at run time.

Figure 5:
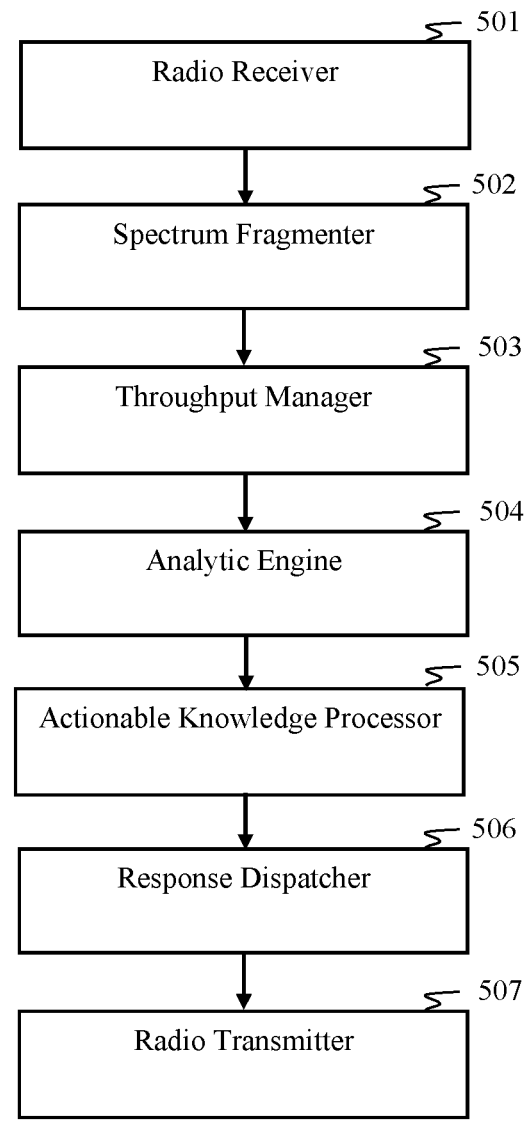
FIG. 5 is a flow diagram according to one aspect of the disclosure.

FIG. 5 is a flow diagram according to one aspect of the disclosure. Aspects disclosed herein, such as in FIG. 5 and the other figures, can be implemented as apparatus configurations comprising structural features that perform the functions, algorithms, and methods described herein. Flow charts and descriptions disclosed herein can embody instructions, such as in software residing on a non-transitory computer-readable medium, configured to operate a processor (or multiple processors). Flow charts and functional descriptions, including apparatus diagrams, can embody methods for operating a communication network(s), coordinating operations which support communications in a network(s), operating network components (such as client devices, server-side devices, relays, and/or supporting devices), and assembling components of an apparatus configured to perform the functions disclosed herein.

A radio receiver 501 comprises one or more radio receivers at one or more edge devices that provide radio sensing data inputs to the cognitive inference and machine learning system. A spectrum fragmenter 502 partitions IQ data received from the radio receiver 501 into independent groups, referred to herein as pulses. The spectrum fragmenter 502 preprocesses the pulses for cleaning, followed by compression for use in downstream processes. Pulse events capture compressed representations of enhanced signals, timestamps corresponding to the beginning and end points of signal chunks, and a scalable amount of metadata, for example. Pulse events are consumed by downstream systems to add more metadata, manage the data flow, and/or generate intelligent responses (e.g., alerts, mitigations, etc.) based on the information within the pulse event. The fragmentation and compression helps reduce loads on a network coupling the edge devices to a central processor's analytics engine.

The spectrum fragmenter 502 in accordance with one aspect is able to monitor large parts of a spectrum and perform signal triage. This provides the ability to rapidly detect, classify, and prioritize detected radio signals based on high-level, context-dependent user directives. Unlike existing technologies that scan the RF spectrum with matched filters searching for specific signature types, feature extraction can be employed in combination with machine learning to generalize discovery of signals as well as dynamically reconfigure receivers to search for specific signal characteristics. Using a configurable feature extraction and a machine learning pipeline, the disclosed system can observe a patchwork of RF spectrum apertures and concurrently detect, learn, and identify distinct signal types from among an extensible set of configurations for domain-specific management.

A throughput manager 503 partitions computational work loads across a hybrid architecture. Upon processing completion, it reassembles the parallelized work into context-specific data and corresponding metadata for use within at least one analytic engine 504. Metadata that is provided can be used for data-driven routing that enables high-level user directives to be interpreted as specific endpoints. For example, the ability to flag high-throughput observations directly to data persistence enables off-line training.

The analytic engine 504 maintains context-specific processing pipelines that generate real-time actionable knowledge. For example, the analytic engine 504 allows multiple machine-learning algorithms to be stacked and networked. This enables supervised and unsupervised approaches to collaborate and infer robust classifications from input data and metadata.

The analytic engine 504 can manage machine learning algorithms to classify collections of observations. Data passes through the analytic engine 504 either as streaming pulse events received in real time or replays of saved data from a data-persistence storage medium. When running in its classification mode, real-time observations arriving as pulse events may be passed through a collection of stacked machine learning algorithms to create per-pulse predictions. In some aspects, analytics running concurrently can veto predictions made by other machine learning models. Pulses that are flagged as unknowns may be routed to a data persistence module so they can be cached for off-line training.

When the analytic engine 504 is running in off-line mod, pulse events cached by the system can undergo analysis to tease apart classification models to segregate different unknown types. Different unknown types can be managed by the analytic engine 504 using hashed representations of their feature metadata. These hashes in turn can be used to create answer keys for automated supervised learning and can enable automated generation in comparison of confusion matrices.

The analytic engine 504 can utilize the throughput manager 503 to distribute computational loads across the hybrid architecture. The system can be configured to run such that the off-line training and the real time classifications can be scheduled across available hardware resources.

Information obtained from streaming pre-cleaned pulses that have been passed over data-driven pathways can be flagged for persistence. Persistence can take a variety of forms, such as storing pre-cleaned pulses output from the spectrum fragmenter 502 using high-fidelity compression. Later, sparse transforms can enable reconstitution in a quality that can be demodulated. Compressed pulses can be captured and placed into caches. Any of various types of storage media can be employed. Caches may be used to enable off-line training to identify correlations and improve classification of new unknown signals.

Data processed by the analytic engine 504 can result in actionable knowledge, expressed as a pulse event, and collected in an actionable knowledge module 505, which can comprise a combination of processing and storage capabilities. The pulse event can contain the compressed signal, feature metadata, and system classifications, with corresponding error estimates. This information can be consumed by downstream processes via customized stream descriptors, such as topics. These context-dependent knowledge streams can be subscribed to and may result in near real-time updates. Downstream systems interpret the streams relative to their operating contexts.

A response dispatcher 506 can be configured for interpreting high-level user directives and applying them to carry out end-user goals. For example, the end user may specify a rule, such as a request to be notified about all low-flying drones that are approaching a protected area. After interpreting this rule, observed signals meeting this criterion are evaluated and triaged related to their risk. Signals with the greatest risk are prioritized and may be responded to using prioritized rule set directives such as 1) attempt to redirect using known mitigation strategies, 2) attempt smart jamming, 3) notify personnel and attempt another jamming strategy, and 4) if all else fails, conduct a kinetic attack. It should be appreciated that user directives may include other criteria, such as, but not limited to, radio frequency, signal type (modulation, bandwidth, duty cycle, as well as others), signal strength, protocol behavior, and signal identifiers (e.g., MAC ID, radio fingerprint, IP address, mobile subscriber identifier, or the like).

The transmit component(s) 507 of the CUAS is responsible for queuing responses that have been received from the response dispatcher 506. In FHSS aspects, for example, responses can be matched with the appropriate timing and frequency position that corresponds to the target timing patterns and the frequency hopping patterns that have been derived from observations or loaded from libraries.

UAV detection, identification, and countermeasure systems and methods have been disclosed herein. The specific network resources to be employed for each system function can be provisioned based on its location in the network, as well as its proximity to other network resources. The network resources can be provisioned with respect to each function's requirement(s), such as maximum tolerable latency, minimum data bandwidth, as well as others. For example, latency-sensitive operations can be performed close to the network edge. Operations requiring a large amount of processing and/or storage resources might be pooled in a central location, such as a data center farther from the edge, or widely distributed across multiple data centers, for example.

The various blocks shown in the figures can be viewed as method steps, and/or as operations that result from operation of computer program code, and/or as a plurality of coupled logic circuit elements constructed to carry out the associated function(s).

In general, the various exemplary aspects may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary aspects of the invention may be practiced in various components, such as integrated circuit chips and modules, and that the exemplary aspects may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry, and radio frequency circuitry that are configurable so as to operate in accordance with the exemplary aspects.

While aspects of the disclosure are directed toward UAVs, such aspects embodied in the systems and methods disclosed herein can be applied to other radio remote-controlled systems and devices, including, but not limited to unmanned nautical vehicles, unmanned terrestrial devices, sensor networks, home automation systems, supervisory control and data acquisition systems, and all types of robotic devices.

The invention claimed is:

1. A method, comprising:
provisioning a computer processor to employ network communication signal metadata for training a cognitive learning and inference system to produce an inferred function, wherein the metadata comprises a syntactic structure of at least one network communication protocol;
provisioning the computer processor to employ the inferred function for mapping metadata of a detected network communication signal to a cognitive profile of a transmitter of the detected network communication signal, wherein the mapping effects intelligent discrimination of the transmitter from at least one other transmitter through corroborative or negating evidentiary observation of properties associated with the metadata of the detected network communication signal; and
provisioning the computer processor to employ the inferred function or the cognitive profile to determine information content in the network communication signal without demodulating or decoding the network communication signal.

2. The method recited in claim 1, wherein the training comprises performing at least one of supervised learning and unsupervised learning.

3. The method recited in claim 1, wherein the syntactic structure comprises a structure of at least one of phrases, clauses, sentences, paragraphs, and conversation formats of the at least one network communication protocol; and at least one of the training and the mapping comprises performing semantic analysis of the metadata.

4. The method recited in claim 1, wherein the mapping comprises employing at least one of grammar rules and grammar shapes corresponding to the at least one network communication protocol to identify a type of data in the detected network communication signal.

5. The method recited in claim 1, further comprising provisioning the computer processor to determine a response to the transmitter based upon the mapping.

6. The method recited in claim 1, wherein the mapping employs at least one of a measured radar cross section; a camera image; an acoustical signature; an infrared signature; an optical signature; navigation data; video data; network management data; and a radio signal measurement comprising at least one of frequency shift, phase offset, delay, angle of arrival, signal strength, change in frequency shift, change in phase offset, change in delay, change in angle of arrival, change in signal strength.

7. The method recited in claim 1, further comprising provisioning the computer processor to associate received network communication signals with the transmitter by comparing the metadata of the detected network communication signal with location information of at least one of the transmitter and the transmitter's intended receiver.

8. A network transceiver comprising at least one processor, memory in electronic communication with the at least one processor, and instructions stored in the memory, the instructions executable by the at least one processor for:
employing network signal metadata to train a cognitive learning and inference system to produce an inferred function, wherein the metadata comprises a syntactic structure of at least one network communication protocol;
employing the inferred function for mapping metadata of a detected network signal to a cognitive profile of a transmitter of the detected network signal, wherein the mapping effects intelligent discrimination of the transmitter from at least one other transmitter through corroborative or negating evidentiary observation of properties associated with the metadata of the detected network signal; and
based on the inferred function or the cognitive profile, determining information content in the network signal without demodulating or decoding the network signal.

9. The network transceiver recited in claim 8, wherein employing the network signal metadata to train the cognitive learning and inference system comprises performing at least one of supervised learning and unsupervised learning.

10. The network transceiver recited in claim 8, wherein the syntactic structure comprises a structure of at least one of phrases, clauses, sentences, paragraphs, and conversation formats of the at least one network communication protocol; and at least one of employing network signal metadata to train and employing the inferred function for mapping comprises performing semantic analysis of the metadata.

11. The network transceiver recited in claim 8, wherein employing the inferred function for mapping comprises employing at least one of grammar rules and grammar shapes corresponding to the at least one network communication protocol to identify a type of data in the detected network signal.

12. The network transceiver recited in claim 8, wherein the memory further comprises instructions executable by the at least one processor for determining content of the detected network signal from its metadata.

13. The network transceiver recited in claim 8, wherein the mapping further employs at least one of a measured radar cross section; a camera image; an acoustical signature; an infrared signature; an optical signature; navigation data; video data; network management data; and a radio signal measurement comprising at least one of frequency shift, phase offset, delay, angle of arrival, signal strength, change in frequency shift, change in phase offset, change in delay, change in angle of arrival, change in signal strength.

14. The network transceiver recited in claim 8, wherein the memory further comprises instructions executable by the at least one processor for associating received network signals with the transmitter by comparing the metadata of the detected network signal with location information of at least one of the transmitter and the transmitter's intended receiver.

15. A non-transitory computer-readable memory having computer readable program code stored therein, said computer readable program code containing instructions executable by at least one processor of a computer system for:
employing network signal metadata to train a cognitive learning and inference system to produce an inferred function, wherein the metadata comprises a syntactic structure of at least one network communication protocol;
employing the inferred function for mapping metadata of a detected network signal to a cognitive profile of a transmitter of the detected network signal, wherein the mapping effects intelligent discrimination of the transmitter from at least one other transmitter through corroborative or negating evidentiary observation of properties associated with the metadata of the detected network signal; and
based on the inferred function or the cognitive profile, determining information content in the network signal without demodulating or decoding the network signal.

16. The computer program product recited in claim 15, wherein employing the network signal metadata to train the cognitive learning and inference system comprises performing at least one of supervised learning and unsupervised learning.

17. The computer program product recited in claim 15, wherein the syntactic structure comprises a structure of at least one of phrases, clauses, sentences, paragraphs, and conversation formats of the at least one network communication protocol; and at least one of employing network signal metadata to train and employing the inferred function for mapping comprises performing semantic analysis of the metadata.

18. The computer program product recited in claim 15, wherein employing the inferred function for mapping metadata comprises employing at least one of grammar rules and grammar shapes corresponding to the at least one network communication protocol to identify a type of data in the detected network signal.

19. The computer program product recited in claim 15, wherein the computer readable program code further comprises instructions executable by the at least one processor for determining content of the detected network signal from its metadata.

20. The computer program product recited in claim 15, wherein the mapping further employs at least one of a measured radar cross section; a camera image; an acoustical signature; an infrared signature; an optical signature; navigation data; video data; network management data; and a radio signal measurement comprising at least one of frequency shift, phase offset, delay, angle of arrival, signal strength, change in frequency shift, change in phase offset, change in delay, change in angle of arrival, change in signal strength.

* * * * *